United States Patent
Davidsson

(10) Patent No.: US 7,602,191 B2
(45) Date of Patent: Oct. 13, 2009

(54) CABLE-TYPE ELECTROMAGNETIC RECEIVER SYSTEM FOR SUBSURFACE EXPLORATION

(75) Inventor: Per Anders Davidsson, Spanga (SE)

(73) Assignee: PGS Geophysical AS, Lysaker (NO)

( * ) Notice: Subject to any disclaimer, the term of this patent is extended or adjusted under 35 U.S.C. 154(b) by 27 days.

(21) Appl. No.: 11/823,940

(22) Filed: Jun. 29, 2007

(65) Prior Publication Data

US 2009/0001987 A1    Jan. 1, 2009

(51) Int. Cl.
*G01V 3/00* (2006.01)

(52) U.S. Cl. .................. 324/347; 324/348; 324/357; 324/365

(58) Field of Classification Search ......... 324/347–375, 324/323, 326–332, 344–345, 334–335; 367/117; 174/70 R, 74 A, 74 R
See application file for complete search history.

(56) References Cited

U.S. PATENT DOCUMENTS

| | | | |
|---|---|---|---|
| 7,026,819 B2 | 4/2006 | Eldesmo et al. | |
| 7,362,102 B2 * | 4/2008 | Andreis | 324/365 |
| 7,388,380 B2 * | 6/2008 | Chen et al. | 324/347 |
| 2006/0186887 A1 | 8/2006 | Strack et al. | |
| 2006/0256654 A1 | 11/2006 | Paulsen | |

FOREIGN PATENT DOCUMENTS

| | | |
|---|---|---|
| EP | 0 556 114 | 2/1993 |
| EP | 1 306 692 | 5/2003 |
| WO | 2005/006022 A1 | 1/2005 |
| WO | WO 2005/006022 | 1/2005 |

OTHER PUBLICATIONS

Nigel Edwards, (2005), Marine Controlled Source Electromagnetics: Principles, Methodologies, Future Commercial Applications, Surveys in Geophysics, pp. 675-700.
Examiner, Thomas Häusser, Apr. 9, 2009, PCT International Search Report PCT/EP2008/00538.

* cited by examiner

*Primary Examiner*—Reena Aurora
(74) *Attorney, Agent, or Firm*—E. Eugene Thigpen; Richard A. Fagin

(57) ABSTRACT

A marine electromagnetic survey cable includes a reference electrode extending substantially along the entire length of the cable. A plurality of spaced apart measuring electrodes is disposed along the cable and each is electrically insulated from the reference electrode. A voltage measuring is circuit functionally coupled between each measuring electrode and the reference electrode.

18 Claims, 3 Drawing Sheets

CABLE-TYPE ELECTROMAGNETIC RECEIVER SYSTEM FOR SUBSURFACE EXPLORATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic survey apparatus for subsurface exploration in the Earth. More particularly, the invention relates to structures for detector electrodes and arrays thereof for detection of electric fields resulting from electromagnetic fields imparted into the Earth.

2. Background Art

Electromagnetic surveying is used for, among other purposes, determining the presence of hydrocarbon bearing structures in the Earth's subsurface. Electromagnetic surveying includes what are called "controlled source" survey techniques. Controlled source electromagnetic surveying techniques include imparting an electric current or a magnetic field into the Earth, when such surveys are conducted on land, or imparting the same into sediments below the water bottom (sea floor) when such surveys are conducted in a marine environment. The techniques include measuring voltages and/or magnetic fields induced in electrodes, antennas and/or magnetometers disposed at the Earth's surface, in the water or on the sea floor. The voltages and/or magnetic fields are induced by interaction of the electromagnetic field caused by the electric current and/or magnetic field imparted into the Earth's subsurface (through the water bottom in marine surveys) with subsurface Earth formations.

One type of marine controlled source electromagnetic surveying known in the art includes imparting alternating electric current into the sediments below the water bottom by applying current from a source, usually disposed on a survey vessel, to a dipole electrode towed by the survey vessel. A dipole electrode is typically an insulated electrical cable having two electrodes thereon at a selected spacing, sometimes 300 to 1000 meters or more. The alternating current has one or more selected frequencies, typically within a range of about 0.1 to 100 Hz. A plurality of detector electrodes is disposed on the water bottom at spaced apart locations, and the detector electrodes are connected to devices that record the voltages induced across various pairs of such electrodes. Such surveying is known as frequency domain controlled source electromagnetic surveying. Frequency domain EM survey techniques are described, for example in U.S. Pat. No. 7,026,819 issued to Eidesmo et al.

Another technique for electromagnetic surveying of subsurface Earth formations known in the art is transient controlled source electromagnetic surveying. In transient controlled source electromagnetic surveying, electric current is imparted into the Earth's subsurface using electrodes on a cable similar to those explained above as used for frequency domain surveying. The electric current may be direct current (DC). At a selected time or times, the electric current is switched off, and induced voltages are measured, typically with respect to time over a selected time interval, using electrodes disposed on the water bottom as previously explained with reference to frequency domain surveying. Structure and composition of the Earth's subsurface are inferred by the time distribution of the induced voltages. Transient electromagnetic surveying techniques are described, for example, in U.S. Patent Application Publication No. 2006/0186887 filed by Strack et al.

Irrespective of the technique used, the presence of hydrocarbon bearing structures can be inferred because of resistivity contrast between hydrocarbon bearing structures, which can have electrical resistivities in a range of several ohm-meters to several hundred ohm-meters, and those of the adjacent, non hydrocarbon bearing Earth formations, which may have resistivities in a range of about 0.2 ohm-meters to several ohm-meters.

There continues to be a need for improved techniques and apparatus for mapping the Earth's subsurface using electromagnetic measurements.

SUMMARY OF THE INVENTION

One aspect of the invention is a marine electromagnetic survey cable. A cable according to this aspect of the invention includes a reference electrode extending substantially along the entire length of the cable. A plurality of spaced apart measuring electrodes is disposed along the cable and each is electrically insulated from the reference electrode. A voltage measuring circuit is functionally coupled between each measuring electrode and the reference electrode.

A marine electromagnetic survey system according to another aspect of the invention includes a sensor cable disposed in a body of water. The sensor cable includes a reference electrode extending substantially along the entire length of the cable, a plurality of spaced apart measuring electrodes disposed along the cable and electrically insulated from the reference electrode, and a voltage measuring circuit functionally coupled between each measuring electrode and the reference electrode. A recording device is functionally coupled to one end of the sensor cable. A source cable is disposed in the body of water. The source cable includes at least one antenna coupled to a source of electric current.

Other aspects and advantages of the invention will be apparent from the following description and the appended claims.

DETAILED DESCRIPTION

Figure 1:
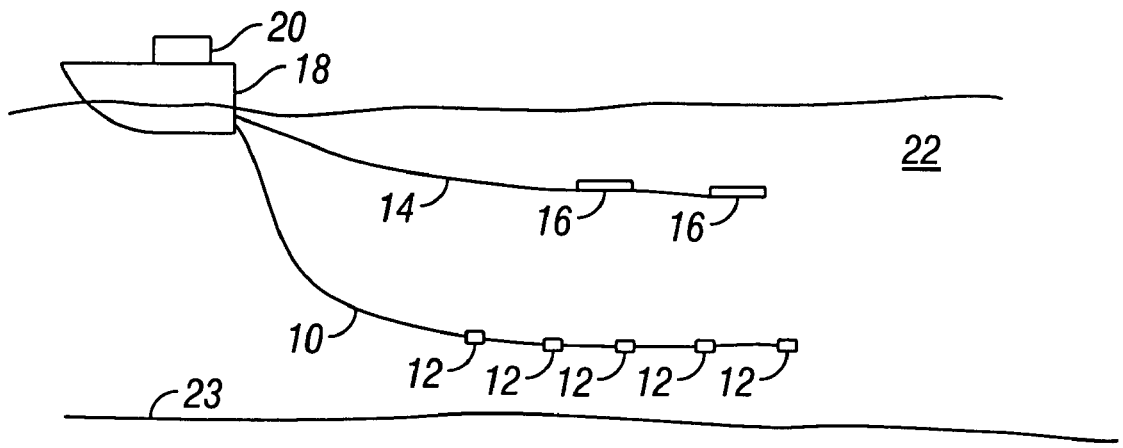
FIG. 1 shows one example of a cable-type electromagnetic survey system according to the invention.

An example marine electromagnetic survey system is shown generally in FIG. 1. The electromagnetic survey system includes a sensor cable 10 having thereon at spaced apart positions a plurality of sensor modules 12. The sensor modules 12 will be explained in more detail with reference to FIG. 2 and FIG. 3. The sensor cable 10 is shown being towed by a survey vessel 18 moving on the surface of a body of water 22 such as a lake or the ocean. Towing the sensor cable 10 is only one possible implementation of a sensor cable. It is within the scope of the present invention for the sensor cable 10 to be deployed on the water bottom 23.

The vessel 18 may include thereon equipment, shown generally at 20 and referred to for convenience as a "recording system" that may include devices (none shown separately) for navigation, energizing electrodes or antennas for imparting an electromagnetic field in the formations below the water bottom 23, and for recording and processing signals generated by the various sensor modules 12 on the sensor cable 10.

100161 The electromagnetic survey system shown in FIG. 1 includes electrodes 16 disposed at spaced apart positions along an electrically insulated source cable 14 that may be towed by the survey vessel 18 or by a different vessel (not shown). The source cable 14 alternatively may be deployed on the water bottom 23. The electrodes 16 may be energized at selected times by an electrical current source (not shown separately) in the recording system 20 or in other equipment (not shown) to induce an electromagnetic field in the formations below the water bottom 23. The configuration shown in FIG. 1 induces a horizontal dipole electric field in the subsurface when the electrodes 16 are energized by electric current. It is entirely within the scope of the present invention to induce vertical dipole electric fields in the subsurface, as well as to induce vertical and/or horizontal dipole magnetic fields in the subsurface. Inducing magnetic fields is typically performed by passing electrical current through a loop antenna or solenoid coil.

Accordingly, the direction of and the type of field induced is not intended to limit the scope of the invention. Further, the invention is applicable to use with both frequency domain (continuous wave) and transient induced electromagnetic fields. See, for example, U.S. Patent Application Publication No. 2006/0186887 filed by Strack et al. for examples of all of the foregoing techniques for inducing an electromagnetic field in the subsurface.

Figure 2:
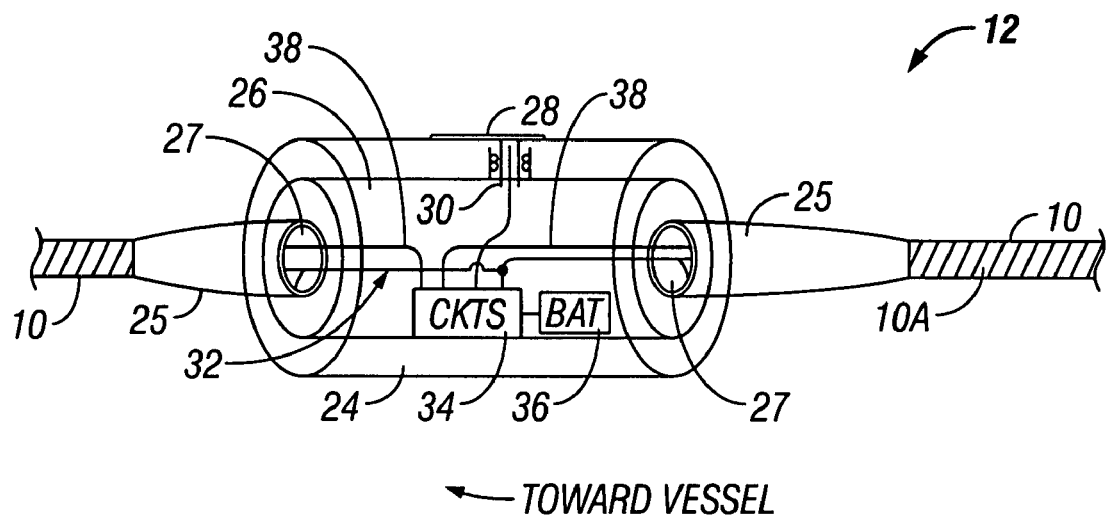
FIG. 2 shows more detail of one example of a sensor module in the cable system of FIG. 1.

One example of a sensor cable 10 and one of the sensor modules 12 is shown in more detail in FIG. 2. The sensor cable 10 may be made from helically wound, electrically conductive armor wires 10A, such as may be made from stainless steel or other high strength, corrosion resistant, electrically conductive material. In one example, to be explained in more detail below the cable 10 may include one or more insulated electrical conductors and one or more optical fibers inside the armor wires 10A. Using an externally armored cable as shown in FIG. 2 may have the advantages of high axial strength of and high resistance to abrasion.

The sensor cable 10 in the present example may be divided into segments, each of which terminates with a combination mechanical/electrical/optical connector 25 ("cable connector") coupled to the longitudinal ends of each cable segment. The cable connector 25 may be any type known in the art to make electrical and optical connection, and to transfer axial loading to a mating connector 27. In the present example such mating connector 27 can be mounted in each longitudinal end of one of the sensor modules 12.

The connectors 25, 27 resist entry of fluid under pressure when the connectors 25, 27 are coupled to each other.

The sensor module housing 24 is preferably pressure resistant and defines a sealed interior chamber 26 therein. The housing 24 may be made from electrically non-conductive, high strength material such as glass fiber reinforced plastic, and should have a wall thickness selected to resist crushing at the maximum expected hydrostatic pressure expected to be exerted on the housing 24. The mating connectors 27 may be arranged in the longitudinal ends of the housing 24 as shown in FIG. 2 such that axial loading along the cable 10 is transferred through the housing 24 by the coupled cable connectors 25 and mating connectors 27. Thus, the sensor cable 10 may be assembled from a plurality of connector-terminated segments each coupled to a corresponding mating connector on a sensor module housing 24. Alternatively, the cable 10 may include armor wires 10A extending substantially continuously from end to end, and the sensor modules 12 may be affixed to the exterior of the armor wires 10A.

A measuring electrode 28 may be disposed on the outer surface of the housing 24, and may be made, for example, from lead, gold, graphite or other corrosion resistant, electrically conductive, low electrode potential material. Electrical connection between the measuring electrode 28 and measuring circuits 34 (explained in more detail with reference to FIG. 3) disposed inside the chamber 26 in the housing 24 may be made through a pressure sealed, electrical feed through bulkhead 30 disposed through the wall of the housing 24 and exposed at one end to the interior of the chamber 26. One such feed through bulkhead is sold under model designation BMS by Kemlon Products, 1424 N. Main Street, Pearland, Tex. 77581.

The measuring circuits 34 may be powered by a battery 36 disposed inside the chamber 26 in the housing 24. Battery power may be preferable to supplying power from the recording system (20 in FIG. 1) over insulated electrical conductors in the sensor cable 10 so as to reduce the possibility of any electromagnetic fields resulting from current flowing along the cable 10 from interfering with the electromagnetic survey measurements made in the various sensor modules 12.

The cable 10 may include one or more optical fibers 38 for conducting command signals, such as from the recording unit (20 in FIG. 1) to the circuits 34 in the various sensor modules 12, and for conducting signal telemetry from the modules 12 to the recording unit (20 in FIG. 1) or to a separate data storage device (not shown). An insulated electrical conductor 32 forming part of the cable (10 in FIG. 2) may pass through the chamber 26 in the housing 24 such that electrical continuity in such conductor 32 is maintained along substantially the entire length of the cable 10. Optical telemetry may be preferable to electrical telemetry for the same reason as using batteries for powering the circuits 34, namely, to reduce the incidence of electromagnetic fields caused by electrical current moving along the cable 10. The insulated electrical conductor 32 in the present example serves as a common potential reference between all of the sensor modules 12.

Figure 3:
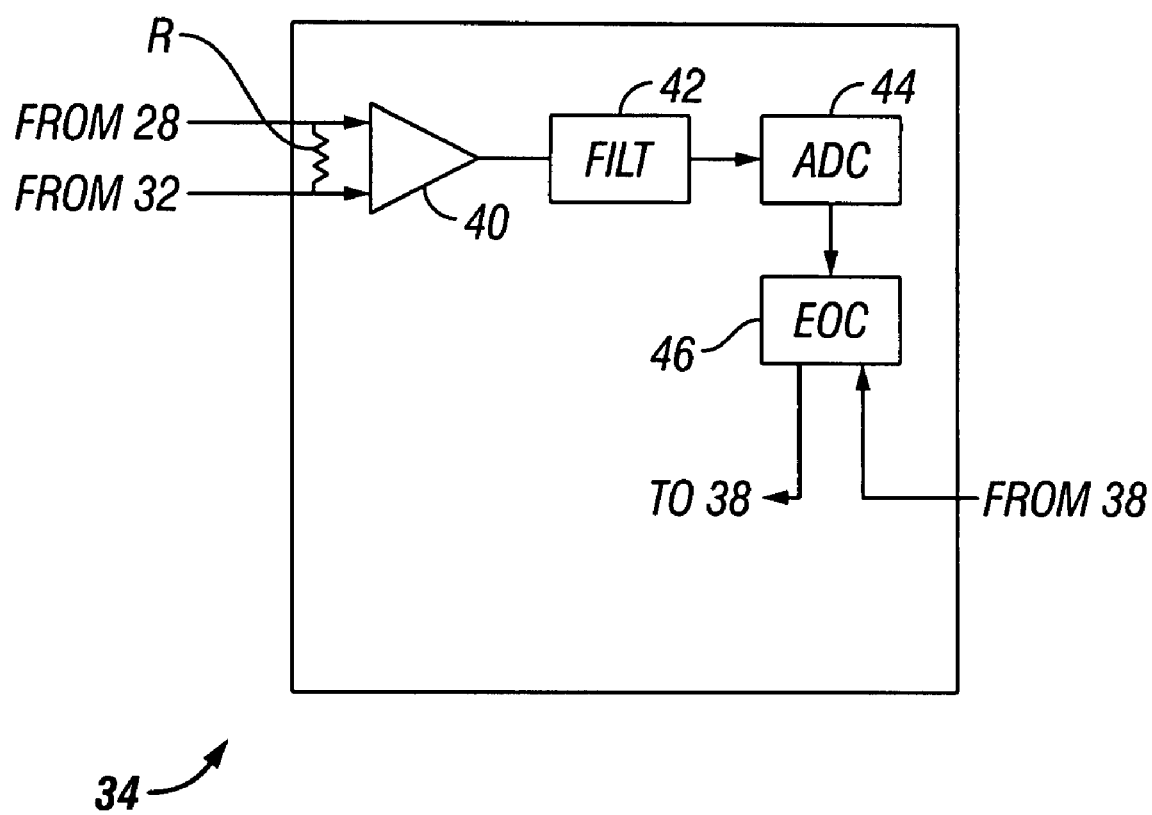
FIG. 3 shows more detail of example measurement and communication circuitry of the sensor module shown in FIG. 2.

One example of the circuits 34 is shown in more detail in FIG. 3. The circuits 34 may include a resistor R electrically coupled between the measuring electrode (28 in FIG. 2) and the insulated conductor 32, which as explained above serves as a common reference. The resistor R is also electrically connected across the input terminals of a preamplifier 40. Thus, voltage drop across the resistor R resulting from voltage difference between a fixed potential reference (conductor 32) and the measuring electrode (28 in FIG. 2) will be input to the preamplifier 40. Such voltage drop will be related to magnitude of the electric field gradient existing where the electrode is located at any point in time.

Output of the preamplifier 40 may be passed through filter 42, which may comprise an anti-aliasing, low pass filter or a filter for attenuating unwanted noise, before being digitized in an analog to digital converter (ADC) 44. Alternatively, the preamplifier 40 output may be directly digitized and the output of the ADC 44 can be digitally filtered. Output of the ADC 44, whether digitally filtered or not, may be conducted to an electrical to optical signal converter (EOC) 46. Output of the EOC 46 may be applied to the one or more optical fibers (38 in FIG. 2) in the cable (10 in FIG. 2) such that optical signals representative of the voltage measured by each measuring electrode (28 in FIG. 2) with respect to the reference conductor (32 in FIG. 2) may be communicated to the recording system (20 in FIG. 1) or to a data storage unit. The type of optical or other signal telemetry used in any implementation is a matter of discretion for the system designer and is not intended to limit the scope of the invention.

Figure 4:
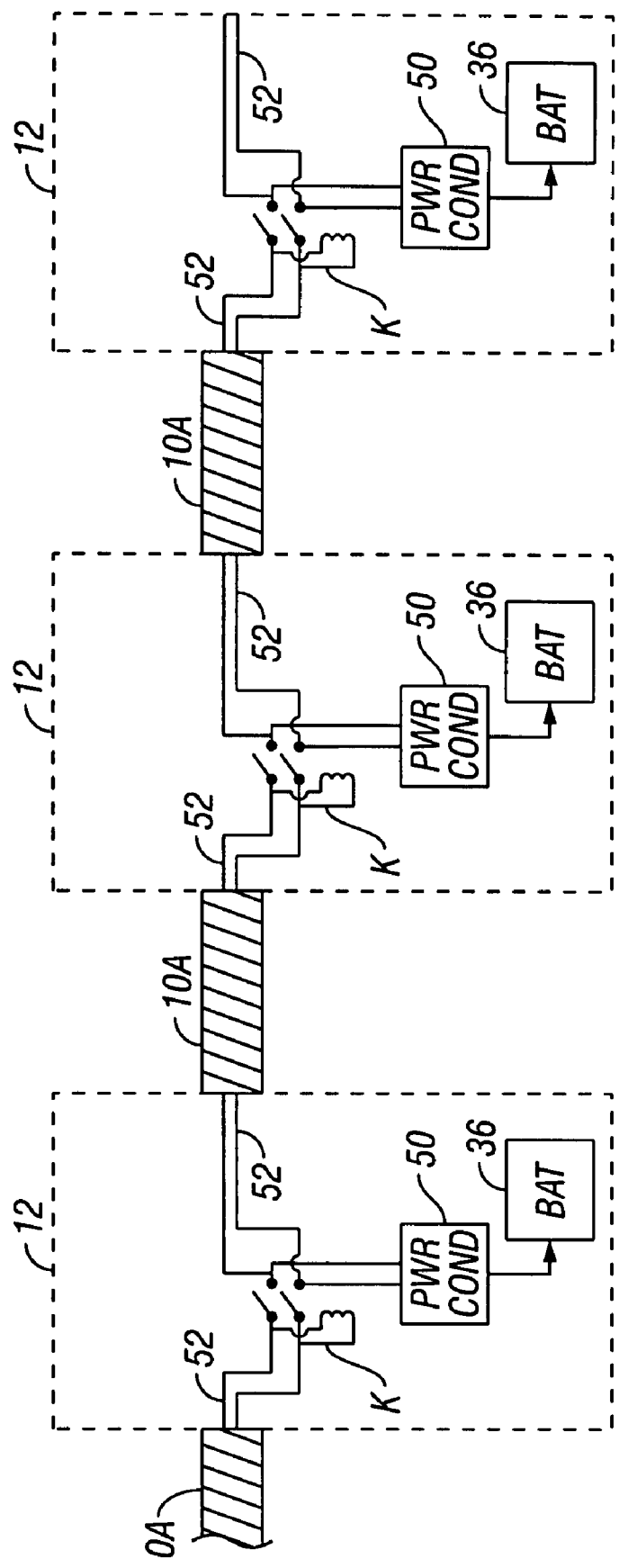
FIG. 4 shows one example of a battery recharging system for the cable of FIG. 1.

In some examples, the batteries 36 may be rechargeable to extend the usable deployment time that the cable (10 in FIG. 1) may have. Referring to FIG. 4, in such examples, the sensor modules 12 may each include a power conditioner 50 in operative connection with the battery 36. The power conditioner 50 may accept, for example, alternating current transmitter over a pair of insulated electrical conductors 52 disposed inside the armor 10A in the cable and convert it to suitable direct current to charge the battery 36 in each module 12. In the example shown in FIG. 4, the electrical conductors 52 from each cable segment are coupled to the conductors in the subsequent cable segment by a relay K in each sensor module 12. Electrical power from the recording unit (20 in FIG. 1) may actuate the relay K in the sensor module 12 nearest the vessel along the cable. When energized, such relay K will make connection to the electrical conductors 52 coupled to the subsequent sensor module. Thus, electrical power will be supplied to all the power conditioners 50 to charge all the batteries 36. When the electrical power in the conductors 52 is switched off from the recording unit (20 in FIG. 1), however, the electrical conductors 52 become electrically uncoupled from each other between successive sensor modules 12. Thus, there are no large, closed electrical conductor loops in the sensor cable 10 that may have stray voltages induced therein by the effects of the induced or other electromagnetic fields in the Earth's subsurface. Such stray voltages themselves would induce electromagnetic fields that could affect the measurements made by the electrodes (28 in FIG. 2) in the various sensor modules. Using armored electrical cable having electrical conductors inside the armor will further reduce the possibility of such stray electromagnetic induction because the conductors will be shielded from the electromagnetic fields by the armor wires 10A. In using the system components shown in FIG. 4, electrical power may be supplied to the conductors 52 during times when signals are not being acquired, so that the batteries 36 may be recharged for subsequent signal acquisition.

A possible benefit of a sensor cable configured as explained herein is that a larger number of electric field amplitude measurements may be made along a given length of cable than may be possible using sensor cables known in the art prior to the present invention. Such prior art cables typically included a longitudinally spaced apart pair of electrodes for each electric field measurement. Such configuration necessarily increases the longitudinal distance between field measurement positions along the cable. Another possible benefit of a cable made according to the invention is that all the measurement electrodes are referenced to the same reference potential electrode. Variations in reference potential may be substantially eliminated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic survey cable, comprising:
    a plurality of spaced apart measuring electrodes disposed along the cable;
    a reference electrode extending along the cable to provide a common potential reference at each of the measuring electrodes, the reference electrode electrically insulated from the measuring electrodes;
    a voltage measuring circuit having an input configured to measure a voltage between each measuring electrode and the reference electrode;
    a battery associated with each measuring circuit to supply electrical power thereto; and
    a relay functionally associated with each battery, and wherein the cable comprises at least one insulated electrical conductor, wherein each relay is configured to close electrical connection along the at least one electrical conductor when energized by a power source at one end of the cable and to break the electrical connection alone the at least one conductor when de-energized.

2. The cable of claim 1 further comprising a housing associated with each measuring electrode, each housing formed from an electrically non-conductive material and defining a sealed chamber therein.

3. The cable of claim 1 wherein each voltage measuring circuit comprises a resistor electrically coupled across the measuring electrode and the reference electrode, and a preamplifier electrically coupled at its input across the resistor.

4. The cable of claim 3 further comprising an electrical to optical converter functionally coupled to an output of the preamplifier, an output of the electrical to optical converter coupled to an optical fiber associated with the cable.

5. The cable of claim 4 wherein the cable comprises at least one optical fiber in signal communication with each electrical to optical converter.

6. The cable of claim 1 further comprising a power conditioner functionally associated with each battery and each relay.

7. The cable of claim 1 wherein the reference electrode comprises armor wires.

8. A marine electromagnetic survey system, comprising:
    a sensor cable disposed in a body of water, the sensor cable including a plurality of spaced apart measuring electrodes disposed along the cable, a reference electrode extending along the cable to provide a common potential reference at each of the measuring electrodes, the reference electrode electrically insulated from the measuring electrodes and a voltage measuring circuit having an input configured to measure a voltage between each measuring electrode and the reference electrode;
    a recording device functionally coupled to one end of the sensor cable;
    a source cable disposed in the body of water, the source cable including at least one antenna coupled to a source of electric current;
    a battery associated with each measuring circuit to supply electrical power thereto; and
    a relay functionally associated with each battery, and wherein the cable comprises at least one insulated electrical conductor, wherein each relay is configured to close electrical connection along the at least one electrical conductor when energized by a power source at one end of the cable and to break the electrical connection alone the at least one conductor when de-energized.

9. The system of claim 8 wherein the at least one antenna comprises a horizontal electric dipole.

10. The system of claim 8 further comprising a housing associated with each measuring electrode, each housing formed from an electrically non-conductive material and defining a sealed chamber therein.

11. The system of claim 8 wherein each voltage measuring circuit comprises a resistor electrically coupled across the measuring electrode and the reference electrode, and a preamplifier electrically coupled at its input across the resistor.

12. The system of claim 11 further comprising an electrical to optical converter functionally coupled to an output of the preamplifier, an output of the electrical to optical converter coupled to an optical fiber associated with the sensor cable.

13. The system of claim 12 wherein the sensor cable comprises at least one optical fiber in signal communication with each electrical to optical converter.

14. The system of claim 8 further comprising a power conditioner functionally associated with each battery and each relay.

15. The system of claim 8 wherein the reference electrode comprises armor wires.

16. A marine electromagnetic survey cable, comprising:
a plurality of spaced apart measuring electrodes disposed along the cable; a reference electrode extending along the cable to provide a common potential reference at each of the measuring electrodes, the reference electrode electrically insulated from the measuring electrodes;
a voltage measuring circuit having an input configured to measure a voltage between each measuring electrode and the reference electrode; and
an electrical to optical converter functionally coupled to an output of the voltage measuring circuit, an output of the electrical to optical converter coupled to an optical fiber associated with the cable.

17. The cable of claim 16 further comprising a housing associated with each measuring electrode, each housing formed from an electrically non-conductive material and defining a sealed chamber therein.

18. The cable of claim 16 wherein each voltage measuring circuit comprises a resistor electrically coupled across the measuring electrode and the reference electrode, and a preamplifier electrically coupled at its input across the resistor.

* * * * *